United States Patent
Uemura et al.

(10) Patent No.: US 6,614,140 B2
(45) Date of Patent: Sep. 2, 2003

(54) MAGNETO GENERATOR

(75) Inventors: Fumito Uemura, Tokyo (JP); Shinji Baba, Tokyo (JP); Yoshihide Masumoto, Tokyo (JP); Tomokazu Umezaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 18 days.

(21) Appl. No.: 09/799,086

(22) Filed: Mar. 6, 2001

(65) Prior Publication Data
US 2002/0047338 A1 Apr. 25, 2002

(30) Foreign Application Priority Data
Sep. 20, 2000 (JP) ......................... 2000-285075

(51) Int. Cl.[7] ............................ H02K 21/22; H02K 5/06
(52) U.S. Cl. ..................... 310/156.12; 310/74; 310/153
(58) Field of Search .................... 310/153, 74, 91, 310/156.28, 156.21, 156.56, 156.53, 156.12; 29/598; 74/572; 123/599, 149 R

(56) References Cited

U.S. PATENT DOCUMENTS

| | | | | |
|---|---|---|---|---|
| 2,976,439 A | * | 3/1961 | Kiekhaefer | |
| 3,258,623 A | * | 6/1966 | Phelon | ......................... 310/74 |
| 3,727,302 A | * | 4/1973 | Phelon | |
| 4,012,651 A | * | 3/1977 | Burson | |
| 4,093,906 A | * | 6/1978 | Draxler | |
| 4,115,716 A | * | 9/1978 | Ogasawala et al. | |
| 4,137,884 A | * | 2/1979 | Odazima et al. | ............... 310/74 |
| 4,625,392 A | * | 12/1986 | Stokes | |
| 4,873,962 A | * | 10/1989 | Safranek | |
| 4,877,986 A | * | 10/1989 | Shimizu | |
| 5,659,216 A | * | 8/1997 | Bisantz | |
| 5,744,887 A | * | 4/1998 | Itoh | |
| 5,757,091 A | * | 5/1998 | Sogabe et al. | |
| 5,936,323 A | * | 8/1999 | Shibukawa et al. | |
| 5,998,902 A | * | 12/1999 | Sleder, Sr. et al. | |

FOREIGN PATENT DOCUMENTS

JP              6-81437         10/1994      ............ H02K/1/27

* cited by examiner

Primary Examiner—Tran Nguyen
(74) Attorney, Agent, or Firm—Sughrue Mion, PLLC

(57) ABSTRACT

Power generation efficiency of a magneto generator is improved. A guard ring 13 made of a material of high magnetic permeability such as carbon steel plate is arranged inside a flywheel 11 for the purpose of holding and guarding magnets 12. the guard ring 13 is provided with opening portions 13a at positions where the guard ring 13 coincides with adjacent two end portions of the neighboring magnets 12. Magnetic flux is prevented from flowing into the neighboring magnets 12 through the guard ring 13 at the time of power generation. The magnetic flux flows into an iron core of a magneto coil 16, and generation efficiency is effectively improved.

10 Claims, 4 Drawing Sheets

PRIOR ART

MAGNETO GENERATOR

BACKGROUND OF THE INVENTION

1. Technical Field

The present invention relates to a magneto generator for power generation utilizing electromagnetic induction between magnet and armature winding by rotating a flywheel.

2. Background Art

FIGS. 6 and 7 show a rotor of a flywheel-type magneto generator according to a prior art disclosed in the Japanese Patent Publication (examined) No. 81437/1994. FIG. 6 is a plan view of the rotor, and FIG. 7 is a sectional view taken along the line VII—VII of FIG. 6. FIG. 8 shows a guard ring of the flywheel-type magneto generator according to another prior art disclosed in the Japanese Patent Publication (examined) No. 81437/1994. In these drawings, reference numeral 1 is a bowl-shaped flywheel formed by a circumferential wall portion and a side wall on one end side of the circumferential wall portion. Numeral 2 is plural magnets 2 continuously arranged in the circumferential direction on the inside of the circumferential wall portion of the flywheel 1. Numeral 3 is a cylindrical guard ring arranged annularly to fit tightly inside the magnets 2, and the guard ring 3 holds the magnets 2. Numeral 4 is a resin with which both side portions of the magnets 2 and spaces between end portions of the respective magnets 2 are filled to fix the magnets 2 and the guard ring 3 integrally onto the flywheel 1. Numeral 5 is a boss portion mounted on a rotary shaft (not shown in the drawings) fixed to the center of the side wall portion of the flywheel 1.

In the rotor of above construction, the guard ring 3 is arranged for the purpose of preventing the magnets 2 from being damaged when the magnets 2 arranged on the circumferential wall portion of the flywheel 1 collide with other object due to magnetic force at the time of handling the rotor. Drawing a steel plate has formed the guard ring 3.

In the rotor of the mentioned conventional magneto generator, each of the magnets 2 has a polarity which is reverse polarity of the neighboring magnets 2 in order to generate an electric power. The guard ring 3 is composed of a carbon steel plate of high magnetic permeability. The guard ring 3 has continuous annular construction as shown in FIG. 8. Therefore, when the rotor rotates along the outer circumference of a magneto coil (not shown), a magnetic flux does not effectively flow from the magnets 2 to an iron core of the magneto coil. But a part of the magnetic flux flows to the neighboring magnets 2 through the guard ring 3. This causes a problem of deterioration in power generation efficiency.

It is certainly possible to form the guard ring 3 of a material of smaller magnetic permeability, for example, a non-magnetic steel plate of stainless steel or the like, and it is also possible to improve power generation efficiency. But, this causes another problem that the material cost is expensive.

SUMMARY OF THE INVENTION

The present invention was made to resolve the above-discussed problems and has an object of obtaining a magneto generator in which a magnetic flux from magnets effectively flows to an iron core of a magneto coil at the time of rotating a rotor of the magneto generator, thereby generating an electric power efficiently.

A magneto generator according to the invention comprises a bowl-shaped flywheel formed by a circumferential wall portion and a side wall portion on one end side of the mentioned circumferential wall portion, plural magnets arranged on an inner peripheral surface of the mentioned flywheel, a cylindrical guard ring being in close contact with inside of the plural magnets, and a magneto coil arranged in the flywheel so as to oppose to the magnets in order to generate an electric power utilizing electromagnetic induction between the magneto coil and the magnets, wherein the mentioned guard ring has opening portions at positions opposing to adjacent two end portions of the mentioned magnets neighboring to each other. As a result of such construction, even when the guard ring is composed of a carbon steel plate of high magnetic permeability, it is possible to prevent a part of magnetic flux from flowing into the neighboring magnets through the guard ring at the time of generating an electric power. Thus, it is possible to improve power generation efficiency.

In the magneto generator according to the invention, it is preferable that the opening portions of the guard ring are arranged at every boundary portion of the neighboring magnets.

Another magneto generator according to the invention comprises a bowl-shaped flywheel formed by a circumferential wall portion and a side wall portion on one end side of the mentioned circumferential wall portion, plural magnets arranged on an inner peripheral surface of the mentioned flywheel and polarized into plural poles, a cylindrical guard ring being in close contact with inside of the plural magnets, and a magneto coil arranged in the flywheel so as to oppose to the magnets in order to generate an electric power utilizing electromagnetic induction between the magneto coil and the magnets, wherein the mentioned guard ring has opening portions at positions opposing to adjacent two end portions of the mentioned magnets neighboring to each other and at positions opposing to magnetic pole boundary portions of the mentioned magnets.

In the magneto generator according to the invention, it is preferable that the opening portions of the guard ring are arranged at every boundary portion of the neighboring magnets and for every magnetic pole boundary portion of the magnets. As a result, it is possible to improve power generation efficiency.

In the magneto generator according to the invention, it is preferable that the opening portions of the guard ring are filled with a resin, the mentioned resin filling a space between the guard ring and the flywheel, and the magnets are embedded in the resin. As a result, the magnets located at the opening portions are not exposed, and it is possible to guard the magnets from being damaged due to any shock.

Other objects, features and advantages of the invention will become apparent in the course of the following description.

DESCRIPTION OF THE PREFERRED EMBODIMENTS

Embodiment 1.

Figure 1:
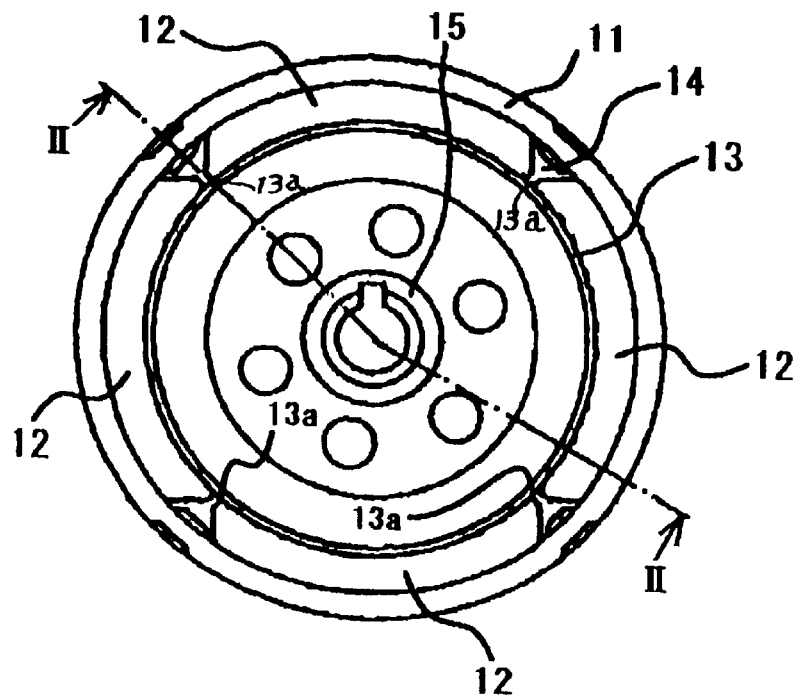
FIG. 1 is a plan view of a magneto generator according to Embodiment 1 of the invention.
Figure 2:
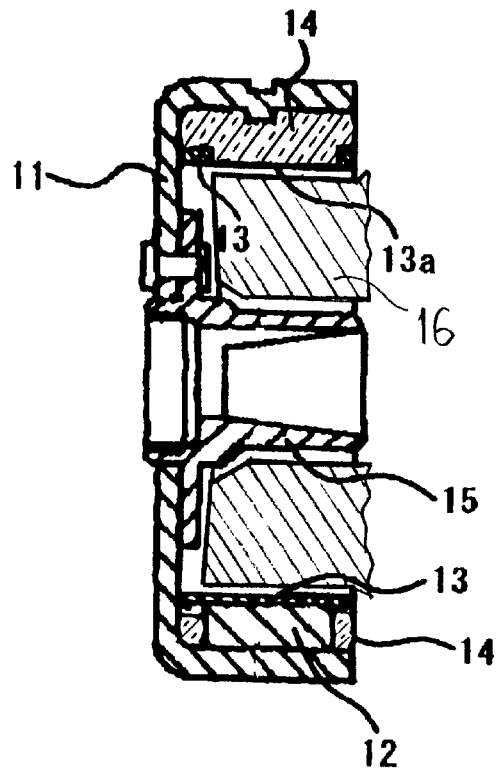
FIG. 2 is a sectional view taken along the line II—II of FIG. 1.
Figure 3:
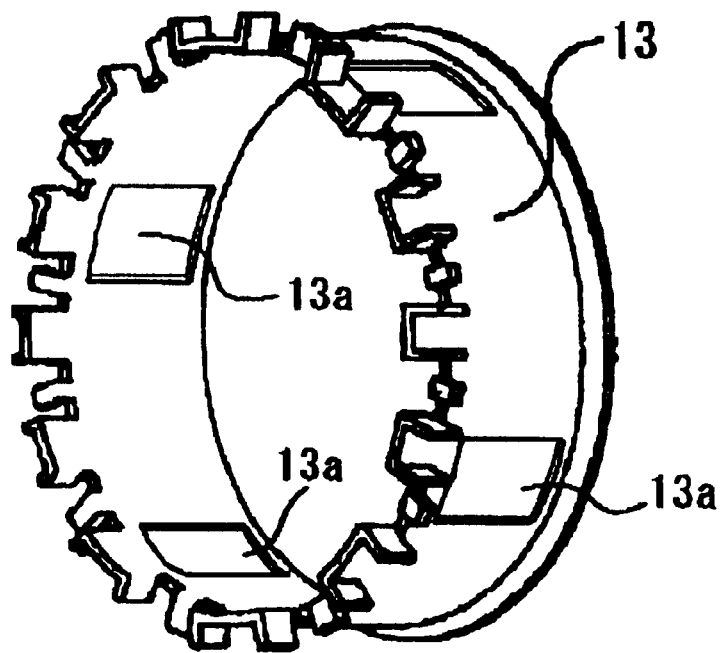
FIG. 3 is a perspective view showing a guard ring of the magneto generator according to Embodiment 1 of the invention.

A magneto generator of the invention is hereinafter described with reference to FIGS. 1 to 5. FIGS. 1 and 2 show a magneto generator according to Embodiment 1 of the invention, and in which FIG. 1 is a plan view of the magneto generator, and FIG. 2 is a sectional view taken along the line II—II of FIG. 1. FIG. 3 is a perspective view of a guard ring. A rotor in this Embodiment 1 is provided with a bowl-shaped flywheel 11 formed by a circumferential wall portion and a side wall portion on one end side of the circumferential wall portion. A boss portion 15 for mounting the rotor on a rotary shaft (not shown) such as a crankshaft of an internal combustion engine is attached to the center of the side wall portion of the flywheel 11. Four long narrow circular arc-shaped magnets 12 are arranged in the circumferential direction on the inner peripheral surface of the circumferential wall portion of the flywheel 11, and the magnets 12 are located at predetermined positions in the axial direction with a guard ring 13.

Numeral 16 is a magneto coil, i.e., a stator held on the stationary side. This stator 16 is arranged inside the guard ring 13 in such a manner as to oppose to the surrounding magnets 12 to generate an electric power utilizing electromagnetic induction between itself and the magnets.

The guard ring 13, which is arranged in the circumferential direction on the inner periphery side of the circumferential wall portion of the flywheel 11, is cylinder-shaped having opening portions 13a and is arranged to closely fit inside the magnets 12. The opening portions 13a are arranged in the circumferential direction of the guard ring 13 with predetermined intervals, and as shown in FIG. 1, adjacent two end portions of the neighboring two magnets 12 are located opposing to one of the opening portions 13a.

The magnets 12 are regularly arranged between the guard ring 13 and the circumferential wall portion of the flywheel 11. Spaces between the magnets 12, both side portions of the magnets 12, and the opening portions 13a formed on the guard ring 13 are all filled with a resin 14 so as to embed the magnets 12 therein.

Figure 4:
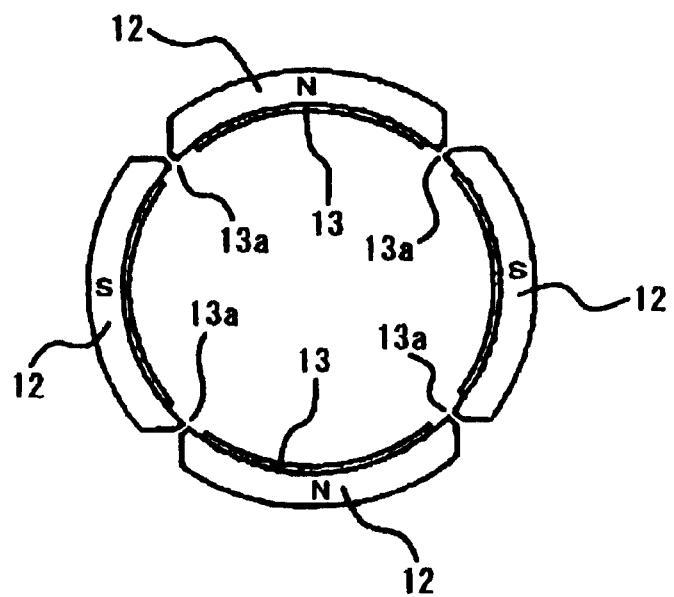
FIG. 4 is a schematic view for explaining the guard ring according to Embodiment 1 of the invention.

FIG. 3 shows the guard ring 13. In a construction in which four single-pole magnets 12 are arranged as shown in FIG. 4, the cylindrical guard ring 13 is provided with four opening portions 13a formed by press working at positions where the guard ring 13 coincides with boundaries of the respective four magnets 12. The function of guarding the magnets 12 rendered by the guard ring 13 is lost at the opening portions 13a of the guard ring 13. However, since both side portions of the respective magnets 12 and spaces between the end portions of the respective magnets 12 are filled with the resin 14, as shown in FIGS. 1 and 2, spaces of the opening portions 13a are also filled with the resin 14 at the same time. Consequently, it becomes possible to guard the magnets 12 by the resin 14. Flowing of the resin 14 into the inner periphery side of the guard ring 13 is prevented by a mold (not shown) at the time of resin molding. In addition, other than the use of the resin 14 to guard the magnets 12 at the opening portions 13a, it is also preferable to arrange another non-magnetic material to absorb any shock given to the magnets 12.

In this manner, the opening portions 13a of the guard ring 13 are formed so as to oppose to adjacent two end portions of the neighboring magnets 12, and this makes it possible to extremely reduce the magnetic permeability in the portions located at the opening portions 13a as compared with a construction in which a carbon steel plate is used (it is known that magnetic permeability ≈1000 in the carbon steel plate, while magnetic permeability ≈1 in the resin with which the opening portions 13a are filled). Thus, it is possible to improve power generation efficiency.

It is desirable that the opening width of each opening portion 13a in the axis direction of the flywheel 11 is not smaller than the width of each magnet 12, and power generation efficiency is improved all the more by enlarging the openings. From the view point of power generation efficiency, it is preferable that the opening portions 13a have larger opening dimensions in the circumferential direction of the flywheel 11 as far as magnet holding function and guard function are sufficiently secured, as a matter of course. In the example described above, one opening portion 13a is arranged at every boundary portion of the neighboring magnets 12. It is also preferable to decrease the number of the opening portions 13a in order to secure strength of the guard ring 13. In such a construction, Power generation efficiency is likewise improved as compared with a construction in which the guard ring 13 is not provided with any opening portion 13a.

Embodiment 2.

Figure 5:
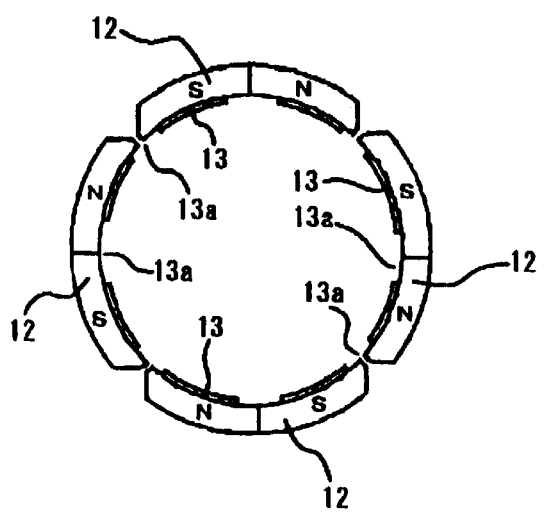
FIG. 5 is a schematic view for explaining a guard ring according to Embodiment 2 of the invention.
Figure 6:
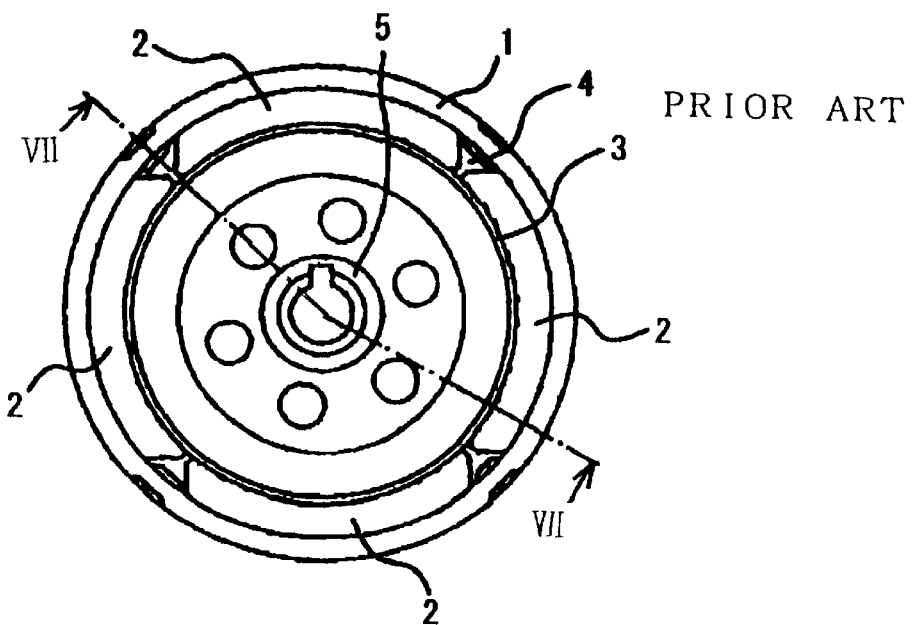
FIG. 6 is a plan view of a magneto generator according to the prior art.
Figure 7:
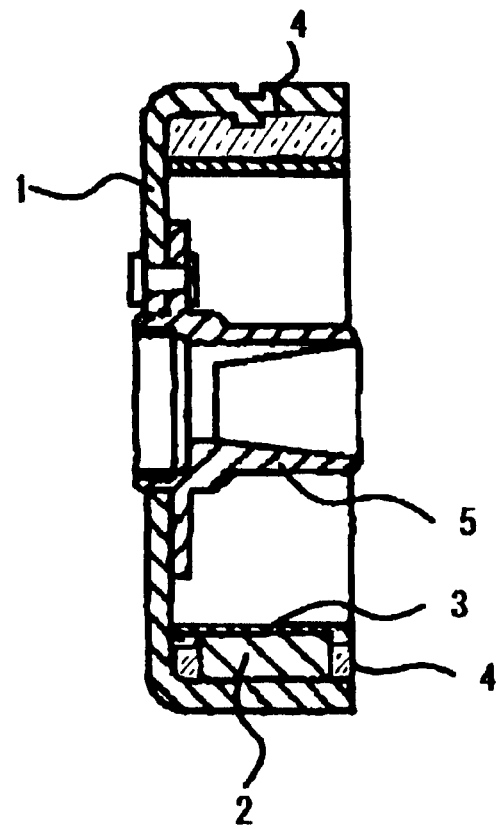
FIG. 7 is a sectional view taken along the line VII—VII of FIG. 6.
Figure 8:
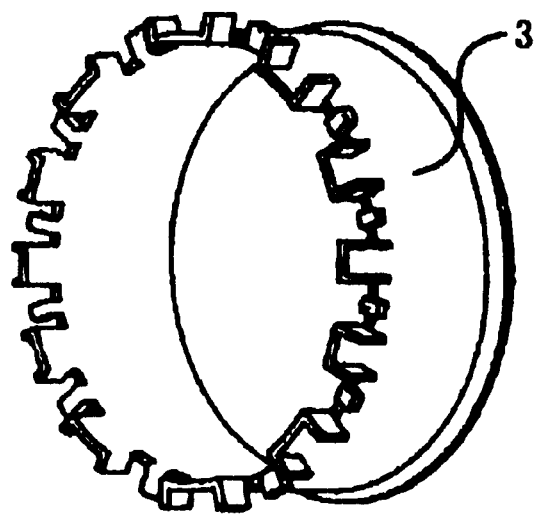
FIG. 8 is a guard ring of the magneto generator according to the prior art.

FIG. 5 shows another embodiment according to the invention, and illustrates a positional relation between the magnets 12 and the opening portions 13a of the guard ring 13. The foregoing Embodiment 1 provides an example in which single-pole magnets are used in the magneto generator, while this Embodiment 2 provides a construction in which each magnet 12 is polarized into plural poles, for example, two poles.

In the construction in which each magnet is polarized, as shown in FIG. 5, the opening portions 13a of the guard ring 13 are arranged at positions opposing to magnetic pole boundaries in the respective magnets 12, in addition to positions each opposing to adjacent two end portions of the neighboring magnets 12. In a construction in which each magnet 12 is polarized into three poles, there exist two boundaries of magnetic poles in each individual magnet 12, and therefore power generation efficiency is improved by forming the opening portions 13a in a number corresponding to that of the boundaries.

In the foregoing example, the guard ring 13 is provided with one opening portion 13a for every boundary portion of the neighboring magnets and for every magnetic pole boundary portion in the magnets. It is also preferable to decrease the number of the opening portions 13a in order to secure strength of the guard ring 13, and power generation efficiency is improved as compared with a construction in which the opening portions 13a are not formed at all.

It is to be understood that the invention is not limited to the foregoing embodiments and various changes and modifications may be made without departing from the spirit and scope of the invention.

What is claimed is:

1. A magneto generator comprising:
   a bowl-shaped flywheel formed by a circumferential wall portion and a side wall portion on one end side or said circumferential wall portion;

plural magnets arranged on an inner peripheral surface of said flywheel and polarized into plural pole, a cylindrical guard ring being in clone contact with inside or said plural magnets; and a magneto coil arranged in the flywheel SD as to oppose to the magnets to generate an electric power utilizing electromagnetic induction between the magneto coil and the magneto;

wherein said guard ring has opening portions at position opposing to adjacent two end portions or said magnets neighboring to each other and at positions opposing to magnetic pole boundary portions of said magnets.

2. The magneto generator according to claim 1, wherein the opening portions of the guard ring are arranged at every boundary portion of the neighboring magneto and for every magnetic pole boundary portion of the magnets.

3. The magneto generator according to claim 1, wherein the opening portions of the guard ring are filled with a resin, said resin tilling a space between said guard ring and said flywheel, and said magnets are embedded in the resin.

4. The magneto generator according to claim 1, wherein an opening width of each opening portion in a axis direction of said flywheel it equal to or greater than a width of each magnet.

5. The magneto generator according to claim 4, wherein an opening height of each opening portion in a circumferential direction of said flywheel is larger than said opening width of each opening portion in mid axis direction of said flywheel.

6. A magneto generator comprising:

a bowl-shaped flywheel formed by a circumferential wall portion and a side wall portion on one end side of raid circumferential wall portion;

plural magnets arranged on an inner peripheral surface of said flywheel and polarized into plural poles, a cylindrical guard ring being in close contact with inside of said plural magnets; and a magneto coil arranged in the flywheel so as to oppose to the magnets to generate an electric power utilizing electromagnetic induction between the magneto coil and the magnets;

wherein said guard ring; has opening portions at positions that coincide with boundaries of adjacent two end portions of said magnets neighboring to each other and at positions opposing to magnetic pole boundary portions of said magnets.

7. The magneto generator according to claim 6, wherein the opening portions of the guard ring are arranged at every boundary portion of the neighboring magnets and for every magnetic pole boundary portion of the magnets.

8. The magneto generator according to claim 6, wherein the opening portions of the guard ring are filled with a resin, said resin filling a space between said guard ring and said flywheel, and said magnets are embedded in the resin.

9. The magneto generator according to claim 6, wherein an opening width of each opening portion in an axis direction of said flywheel is equal to or greater than a width of each magnet.

10. The magneto generator according to claim 9, wherein an opening height of each opening portion in a circumferential direction of said flywheel is larger than said opening width of each opening portion in said axis direction of said flywheel.

* * * * *